(12) United States Patent
Li et al.

(10) Patent No.: US 11,333,919 B2
(45) Date of Patent: May 17, 2022

(54) DISPLAY PANEL

(71) Applicant: Shenzhen China Star Optoelectronics Semiconductor Display Technology Co., Ltd., Shenzhen (CN)

(72) Inventors: Lixia Li, Shenzhen (CN); Ningbo Yi, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 205 days.

(21) Appl. No.: 16/652,424

(22) PCT Filed: Mar. 6, 2020

(86) PCT No.: PCT/CN2020/078276
§ 371 (c)(1),
(2) Date: Mar. 31, 2020

(87) PCT Pub. No.: WO2021/147147
PCT Pub. Date: Jul. 29, 2021

(65) Prior Publication Data
US 2021/0405441 A1    Dec. 30, 2021

(30) Foreign Application Priority Data
Jan. 20, 2019  (CN) .................. 202010065315.X

(51) Int. Cl.
*G02F 1/1335* (2006.01)
*G02F 1/1343* (2006.01)
(52) U.S. Cl.
CPC .. *G02F 1/133512* (2013.01); *G02F 1/133514* (2013.01); *G02F 1/134309* (2013.01); *G02F 1/134345* (2021.01)

(58) Field of Classification Search
CPC ......... G02F 1/133512; G02F 1/134345; G02F 1/134309
See application file for complete search history.

(56) References Cited

U.S. PATENT DOCUMENTS

| 2010/0195037 A1* | 8/2010 | Imakawa ............ G02F 1/13394 349/139 |
| 2015/0206818 A1* | 7/2015 | Choi .................... G02F 1/13458 349/46 |
| 2018/0143473 A1* | 5/2018 | Yamazaki ............ G02F 1/1368 |
| 2020/0272004 A1 | 8/2020 | Song et al. |

FOREIGN PATENT DOCUMENTS

| CN | 102645781 | 8/2012 |
| CN | 107255894 | 10/2017 |
| CN | 108227274 | 6/2018 |
| EP | 2746902 | 6/2014 |

* cited by examiner

*Primary Examiner* — Jessica M Merlin

(57) ABSTRACT

The present invention provides a display panel. The display panel includes an array substrate and a color filter substrate disposed opposite to each other. The array substrate includes a first substrate and a plurality of pixel units distributed on the first substrate in an array. The pixel units include a gate disposed on the first substrate and a pixel electrode disposed above the gate. The gate includes a first edge portion disposed adjacent to the pixel electrode, and an orthographic projection of the pixel electrode projected on the first substrate covers an orthographic projection of the first edge portion projected on the first substrate.

10 Claims, 3 Drawing Sheets

DISPLAY PANEL

RELATED APPLICATIONS

This application is a National Phase of PCT Patent Application No. PCT/CN2020/078276 having International filing date of Mar. 6, 2020, which claims the benefit of priority of Chinese Patent Application No. 202010065315.X filed on Jan. 20, 2020. The contents of the above applications are all incorporated by reference as if fully set forth herein in their entirety.

FIELD AND BACKGROUND OF THE INVENTION

The present invention relates to the field of display technologies, and in particular, to a display panel.

Currently, liquid crystal display panels generally comprise a color filter substrate and an array substrate that are disposed opposite to each other. A gate is disposed on the array substrate, a color filter electrode is disposed on the color filter substrate, and a liquid crystal layer is disposed between the color filter substrate and the array substrate.

In a traditional pixel design, due to a voltage difference between a gate and a common electrode, the voltage difference between the gate and the common electrode can easily cause liquid crystals to deflect and cause light leakage, which affects display quality.

SUMMARY OF THE INVENTION

An embodiment of the present invention provides a display panel to solve the technical problem that due to a voltage difference between a gate and a common electrode, liquid crystals may be deflected due to the voltage difference between the gate and the common electrode, thereby causing light leakage and affecting display quality.

In a first aspect, the present invention provides a display panel comprising an array substrate and a color filter substrate disposed opposite to each other, and a liquid crystal layer disposed between the array substrate and the color filter substrate, wherein the array substrate comprises a first substrate and a plurality of pixel units distributed on the first substrate in an array;

wherein the pixel units comprise a gate disposed on the first substrate and a pixel electrode disposed above the gate, the gate is formed of an opaque metal material, the gate comprises a first edge portion disposed adjacent to the pixel electrode, and an orthographic projection of the pixel electrode projected on the first substrate covers an orthographic projection of the first edge portion projected on the first substrate.

In some embodiments, the color filter substrate comprises a second substrate and a black matrix disposed on a side of the second substrate close to the array substrate, and an orthographic projection of the black matrix projected on the first substrate does not coincide with the orthographic projection of the first edge portion projected on the first substrate.

In some embodiments, the orthographic projection of the pixel electrode projected on the first substrate covers an orthographic projection of the gate projected on the first substrate.

In some embodiments, the pixel electrode comprises a main pixel electrode and a sub-pixel electrode that are independent of each other, and an orthographic projection of the main pixel electrode projected on the first substrate covers the orthographic projection of the first edge portion projected on the first substrate.

In some embodiments, the gate comprises a second edge portion faced away from the first edge portion, and an orthographic projection of the sub-pixel electrode projected on the first substrate does not coincide with an orthographic projection of the gate projected on the first substrate.

In some embodiments, the orthographic projection of the black matrix projected on the first substrate covers an orthographic projection of the second edge portion projected on the first substrate.

In some embodiments, the gate comprises a second edge portion faced away from the first edge portion, and an orthographic projection of the sub-pixel electrode projected on the first substrate covers an orthographic projection of the second edge portion projected on the first substrate.

In some embodiments, an overlapping area of the orthographic projection of the main pixel electrode projected on the first substrate and an orthographic projection of the gate projected on the first substrate is greater than an overlapping area of the orthographic projection of the sub-pixel electrode projected on the first substrate and the orthographic projection of the gate projected on the first substrate.

In some embodiments, the orthographic projection of the main pixel electrode projected on the first substrate covers an orthographic projection of the gate projected on the first substrate.

In some embodiments, the orthographic projection of the black matrix projected on the first substrate does not coincide with the orthographic projection of the gate projected on the first substrate.

In a second aspect, the present invention further provides a display panel comprising an array substrate and a color filter substrate disposed opposite to each other, and a liquid crystal layer disposed between the array substrate and the color filter substrate, wherein the array substrate comprises a first substrate and a plurality of pixel units distributed on the first substrate in an array;

wherein the pixel units comprise a gate disposed on the first substrate and a pixel electrode disposed above the gate, the gate comprises a first edge portion disposed adjacent to the pixel electrode, and an orthographic projection of the pixel electrode projected on the first substrate covers an orthographic projection of the first edge portion projected on the first substrate.

In some embodiments, the color filter substrate comprises a second substrate and a black matrix disposed on a side of the second substrate close to the array substrate, and an orthographic projection of the black matrix projected on the first substrate does not coincide with the orthographic projection of the first edge portion projected on the first substrate.

In some embodiments, the orthographic projection of the pixel electrode projected on the first substrate covers an orthographic projection of the gate projected on the first substrate.

In some embodiments, the pixel electrode comprises a main pixel electrode and a sub-pixel electrode that are independent of each other, and an orthographic projection of the main pixel electrode projected on the first substrate covers the orthographic projection of the first edge portion projected on the first substrate.

In some embodiments, the gate comprises a second edge portion faced away from the first edge portion, and an orthographic projection of the sub-pixel electrode projected on the first substrate does not coincide with an orthographic projection of the gate projected on the first substrate.

In some embodiments, the orthographic projection of the black matrix projected on the first substrate covers an orthographic projection of the second edge portion projected on the first substrate.

In some embodiments, the gate comprises a second edge portion faced away from the first edge portion, and an orthographic projection of the sub-pixel electrode projected on the first substrate covers an orthographic projection of the second edge portion projected on the first substrate.

In some embodiments, an overlapping area of the orthographic projection of the main pixel electrode projected on the first substrate and an orthographic projection of the gate projected on the first substrate is greater than an overlapping area of the orthographic projection of the sub-pixel electrode projected on the first substrate and the orthographic projection of the gate projected on the first substrate.

In some embodiments, the orthographic projection of the main pixel electrode projected on the first substrate covers an orthographic projection of the gate projected on the first substrate.

In some embodiments, the orthographic projection of the black matrix projected on the first substrate does not coincide with the orthographic projection of the gate projected on the first substrate.

A pixel electrode is used to shield an edge portion of a gate, and the pixel electrode is used to effectively shield an electric field between the edge portion of the gate and a common electrode, thereby preventing a voltage difference between the gate and the common electrode from causing liquid crystals to deflect and causing light leakage, and improving display quality. Moreover, an area of a black matrix can be reduced to improve an aperture ratio and transmittance of a pixel. When a main pixel electrode is overlapped with the gate, it can also balance a best common voltage in a primary region and a best common voltage in a secondary region to prevent problems such as crosstalk and image sticking.

REFERENCE NUMERALS

10: array substrate; 11: first substrate; 12: gate; 121: first edge portion; 122: second edge portion; 13: gate insulating layer; 14: pixel electrode; 141: main pixel electrode; 142: sub-pixel electrode; 15: primary region; 16: secondary region;
20: color filter substrate; 21: second substrate; 22: black matrix; 23: common electrode;
30: liquid crystal layer; 41: first connection line; 42: second connection line.

DESCRIPTION OF THE SPECIFIC EMBODIMENTS OF THE INVENTION

The present invention will be further described in detail below with reference to the accompanying drawings and embodiments. In particular, the following examples are only intended to illustrate the invention, but do not limit the scope of the invention. In the same manner, the following embodiments are only partial embodiments rather than all embodiments of the present invention, and all other embodiments obtained by those skilled in the art without creative efforts are within the scope of the present invention.

The present invention is directed to a current liquid crystal display panel. Due to a voltage difference between a gate and a common electrode, liquid crystals may be deflected as a result of the voltage difference between the gate and the common electrode, thereby causing light leakage and affecting display quality. The present invention can solve the above technical problem.

Figure 1:
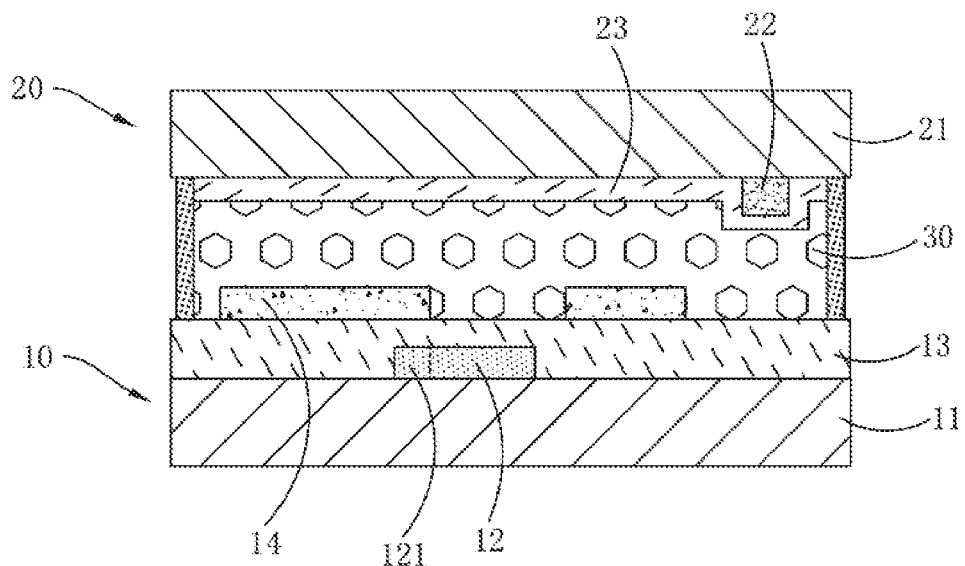
FIG. 1 is a schematic structural view of a display panel according to a first embodiment of the present invention.

A display panel is shown in FIG. 1. The display panel comprises an array substrate 10 and a color filter substrate 20 disposed opposite to each other, and a liquid crystal layer 30 disposed between the array substrate 10 and the color filter substrate 20.

Specifically, the array substrate 10 comprises a first substrate 11 and a plurality of pixel units distributed on the first substrate 11 in an array. The color filter substrate 20 comprises a second substrate 21 and a common electrode 23 disposed on a side of the second substrate 21 adjacent to the array substrate 10.

Specifically, the pixel unit comprises a gate 12 disposed on the first substrate 11 and a pixel electrode 14 disposed above the gate 12. A gate insulating layer 13 covering the gate 12 is further provided on the first substrate 11, and the pixel electrode 14 is disposed above the gate insulating layer 13.

The gate 12 comprise a first edge portion 121 disposed adjacent to the pixel electrode 14. An orthographic projection of the pixel electrode 14 projected on the first substrate 11 covers an orthographic projection of the first edge portion 121 projected on the first substrate 11.

It should be noted that, for those skilled in the art, the gate 12 is formed of an opaque metal material. The pixel electrode 14 can effectively shield an electric field between the first edge 121 of the gate 12 and the common electrode 23, and combine an opacity of the gate 12 at the same time to prevent the voltage difference between the gate 12 and the common electrode 23 on the color filter substrate 20 from causing the liquid crystals to deflect and causing the light leakage.

Specifically, the color filter substrate 20 further comprises a black matrix 22 disposed on a side of the second substrate 21 adjacent to the array substrate 10. The black matrix 22 is disposed between the common electrode 23 and the second substrate 21.

In a first embodiment, an orthographic projection of the black matrix 22 projected on the first substrate 11 does not coincide with an orthographic projection of the first edge portion 121 projected on the first substrate 11.

The pixel electrode 14 is used to shield the edge portion of the gate 12, so there is no need to provide the black matrix 22 directly above the edge portion of the gate 12. This reduces an area of the black matrix 22 and improves a pixel aperture ratio and transmittance.

Figure 2:
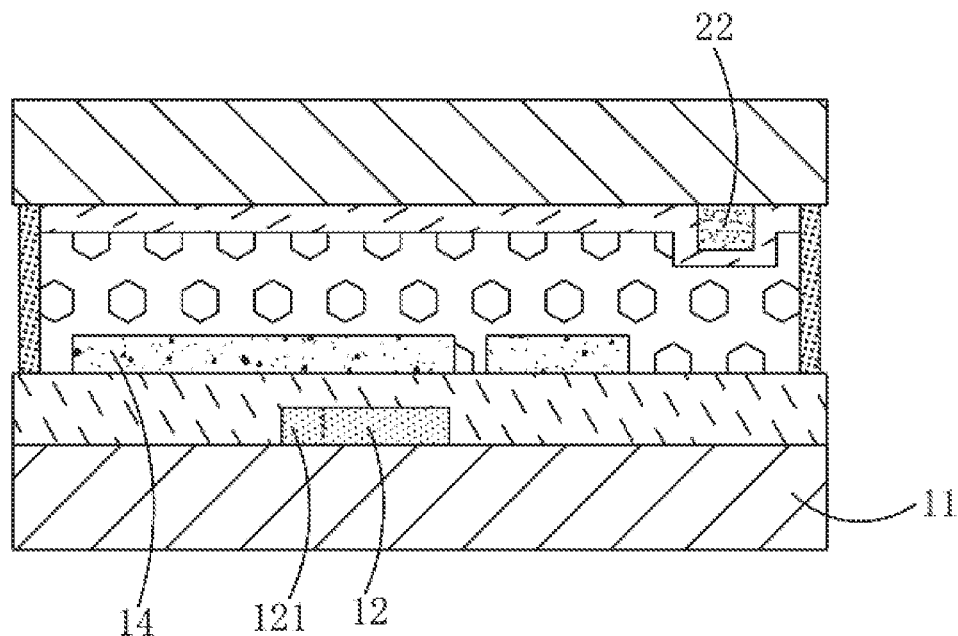
FIG. 2 is a schematic structural view of a display panel according to a second embodiment of the present invention.

In a second embodiment, as shown in FIG. 2, an orthographic projection of the pixel electrode 14 projected on the first substrate 11 covers an orthographic projection of the gate 12 projected on the first substrate 11.

Further, an orthographic projection of the black matrix 22 projected on the first substrate 11 does not coincide with the orthographic projection of the gate 12 projected on the first substrate 11. An area of the black matrix 22 is further reduced to improve the pixel aperture ratio and transmittance.

Figure 3:
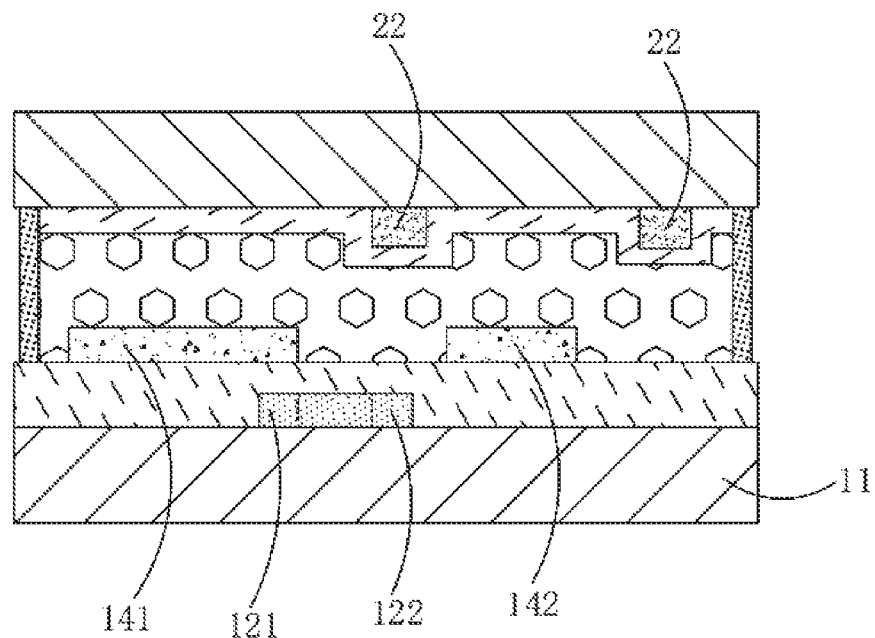
FIG. 3 is a schematic structural view of a display panel according to a third embodiment of the present invention.

As shown in FIG. 3, the pixel electrode 14 comprises a main pixel electrode 141 and a sub-pixel electrode 142 that are independent of each other. The pixel unit has a primary region 15 and a secondary region 16. The primary pixel electrode 141 is disposed in the primary region 15, and the secondary pixel electrode 142 is disposed in the secondary region 16.

Wherein, the primary region 15 and the secondary region 16 may each comprise at least four domain regions. Rotation angles of liquid crystal molecules in the four domain regions of the primary region 15 and the four domain regions of the secondary region 16 in a display unit are different, so that color shift can be relieved and more viewing angle requirements can be met.

Specifically, the first edge portion 121 is disposed on a side of the gate 12 adjacent to the main pixel electrode 141. An orthographic projection of the main pixel electrode 141 projected on the first substrate 11 covers an orthographic projection of the first edge portion 121 projected on the first substrate 11.

As known to those skilled in the art, in a display panel using a multi-domain pixel structure, a common electrode voltage required by the pixel unit is a best common voltage. When a best common voltage of the primary region 15 is different from a best common voltage of the secondary region 16, there will be problems such as crosstalk and image sticking.

Figure 4:
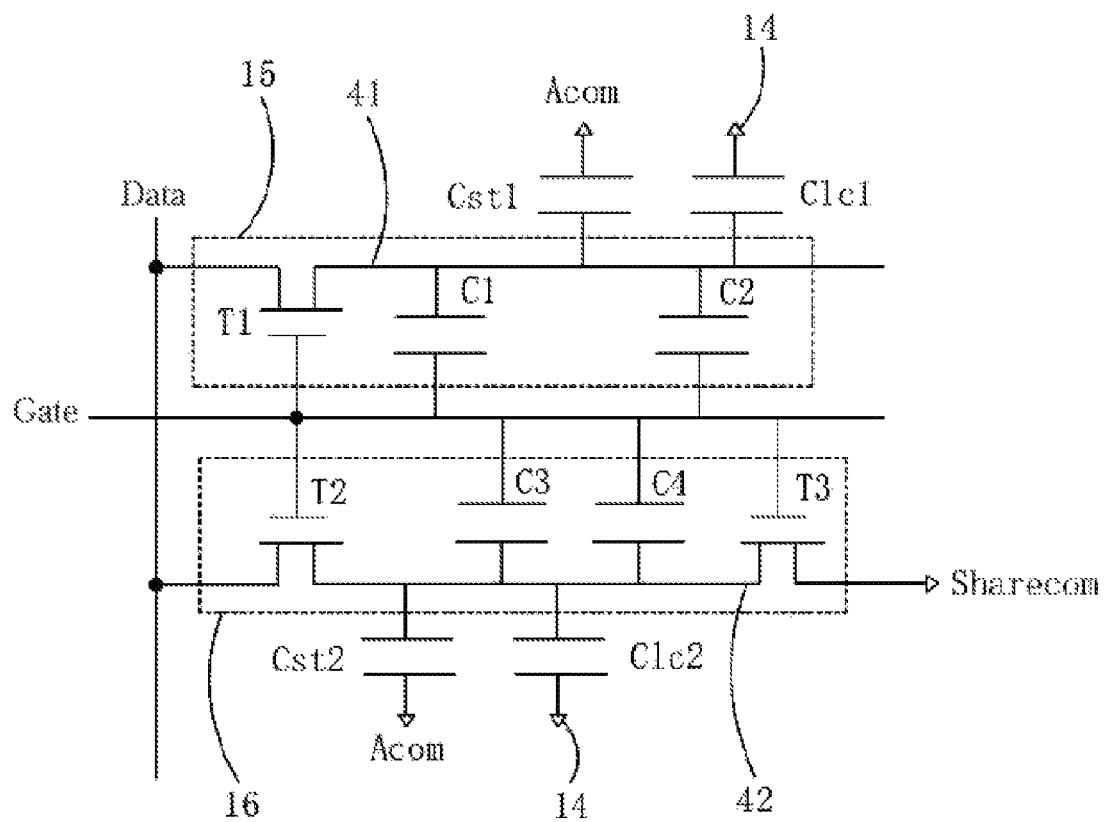
FIG. 4 is a schematic view of a pixel structure of a display panel according to an embodiment of the present invention.

As shown in FIG. 4, the display panel further comprises a plurality of scan lines Gate arranged in a horizontal direction and a plurality of data lines Data arranged in a vertical direction. The plurality of scan lines Gate are arranged at vertical intervals, and the plurality of data lines Data are arranged at horizontal intervals. Each of the scan lines Gate corresponds to one row of the pixel units, and each of the data lines Data corresponds to one row of scan lines Gate.

Take each pixel unit comprising 8 domain regions and 3 thin film transistors as an example. The display unit comprises a first connection line 41 and a first transistor T1 disposed in the primary region 15. A gate of the first transistor T1 is electrically connected to the scan line Gate, a source is electrically connected to the data line Data, and a drain is electrically connected to the first connection line 41. A liquid crystal capacitor Clc1 in the primary region is connected in series between the first connection line 41 and the common electrode 23, and a storage capacitor Cst1 in the primary region is connected in series between the first connection line 41 and the common electrode Acom. A first parasitic capacitor C1 and a second parasitic capacitor C2 are connected in series between the first connection line 41 and the scan line Gate, and the first parasitic capacitor C1 and the second parasitic capacitor C2 are arranged in parallel.

The display unit further comprises a second connection line 42, a second transistor T2, and a shared transistor T3 disposed in the secondary region 16. A gate of the second transistor T2 is electrically connected to the scan line Gate, and a source is electrically connected to the data line Data. A drain is electrically connected to a source of the shared transistor T3 through the second connection line 42, and a drain of the shared transistor T3 is electrically connected to a shared electrode Sharecom. A liquid crystal capacitor Clc2 in the secondary region is connected in series between the second connection line 42 and the common electrode 23. A storage capacitor Cst2 in the primary region is connected in series between the second connection line 42 and the common electrode Acom. A third parasitic capacitor C3 and a fourth parasitic capacitor C4 are connected in series between the second connection line 42 and the scan line Gate, and the third parasitic capacitor C3 and the fourth parasitic capacitor C4 are arranged in parallel.

It should be noted that two poles of each of the liquid crystal capacitor Clc1 in the primary region, the storage capacitor Cst1 in the primary region, the liquid crystal capacitor Clc2 in the secondary region, and the storage capacitor Cst2 in the secondary region usually correspond to the pixel electrode 14 (or a storage electrode having the same potential as the pixel electrode 14) and the common electrode Acom, respectively.

When the main pixel electrode 141 and the gate 12 are not overlapped, only the first parasitic capacitance C1 exists in the primary region 15, and a capacitance value of the first parasitic capacitance C1 is less than a sum of a capacitance value of the third parasitic capacitance C3 and a capacitance value of the fourth parasitic capacitance C4. Therefore, a capacitance value of the parasitic capacitance of the primary region 15 is less than a capacitance value of the parasitic capacitance of the secondary region 16, which causes a feed-through voltage of the primary region 15 to be less than a feed-through voltage of the secondary region 16, and further causes the best common voltage of the primary region 15 to be different from the best common voltage of the secondary region 16, which may result in problems such as crosstalk and image sticking.

The capacitance value of the parasitic capacitance of the primary region 15 can be increased by disposing the main pixel electrode 141 overlapped with the first edge portion 121 of the gate 12, using the main pixel electrode 141 to shield the edge portion of the gate 12, and forming the second parasitic capacitance C2 disposed between the main pixel electrode 141 and the first edge portion 121 of the gate 12, so as to balance the best common voltage of the primary region 15 and the best common voltage of the secondary region 16 to prevent problems such as crosstalk and image sticking.

Specifically, the gate 12 further comprises a second edge portion 122 faced away from the first edge portion 121.

In a third embodiment, an orthographic projection of the sub-pixel electrode 142 projected on the first substrate 11 does not coincide with an orthographic projection of the gate 12 projected on the first substrate 11.

Further, an orthographic projection of the black matrix 22 projected on the first substrate 11 covers an orthographic projection of the second edge portion 122 projected on the first substrate 11.

Preventing a capacitance formed between the sub-pixel electrode 142 and the gate 12 from increasing the parasitic capacitance of the secondary region 16 causes the best common voltage of the primary region 15 and the best common voltage of the secondary region 16 to be different. Moreover, the main pixel electrode 141 and the black matrix 22 are used to block light on both sides of the gate 12 to prevent light leakage.

Figure 5:
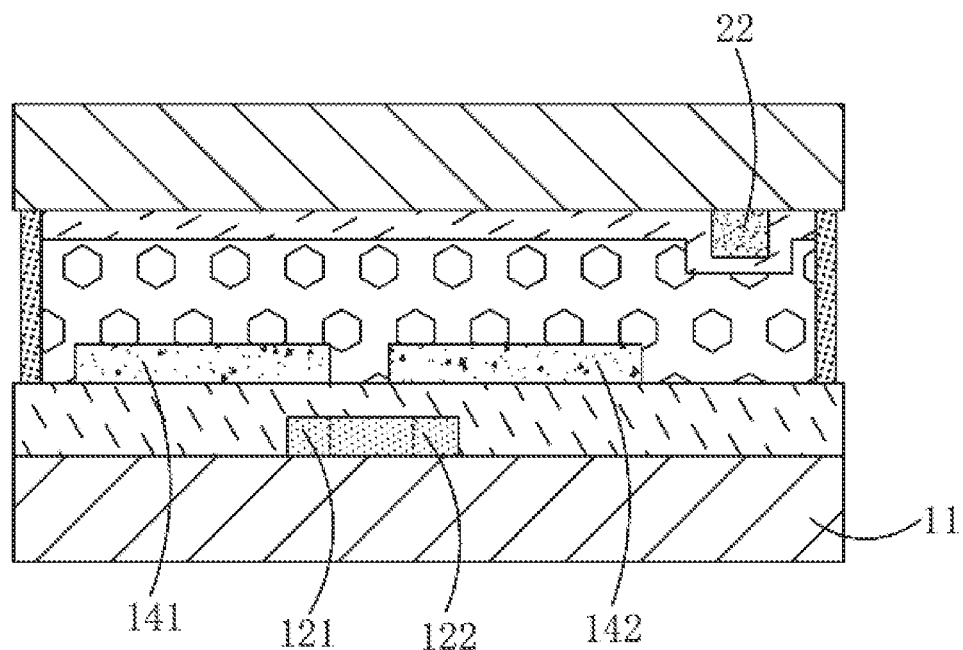
FIG. 5 is a schematic structural view of a display panel according to a fourth embodiment of the present invention.

In a fourth embodiment, as shown in FIG. 5, an orthographic projection of the sub-pixel electrode 142 projected on the first substrate 11 covers an orthographic projection of the second edge portion 122 projected on the first substrate 11.

Further, an orthographic projection of the black matrix 22 projected on the first substrate 11 does not coincide with an orthographic projection of the gate 12 projected on the first substrate 11.

The second pixel portion 122 of the gate 12 is shielded by the sub-pixel electrode 142, so that there is no need to provide the black matrix 22 directly above the gate 12. An area of the black matrix 22 is reduced to provide a pixel aperture ratio and transmittance.

Further, an overlapping area of an orthographic projection of the main pixel electrode 141 projected on the first substrate 11 and the orthographic projection of the gate 12 projected on the first substrate 11 is S1, an overlapping area of the orthographic projection of the sub-pixel electrode 142 projected on the first substrate 11 and the orthographic projection of the gate 12 projected on the first substrate 11 is S2, and S1 is greater than S2.

The main pixel electrode 141 and the sub-pixel electrode 142 are used to shield the edge portion of the gate 12, and moreover, the overlapping area of the main pixel electrode 141 and the gate 12 is set to be greater than the overlapping area of the sub-pixel electrode 142 and the gate 12, so that an increase in the parasitic capacitance of the primary region 15 is greater than an increase of the parasitic capacitance of the secondary region 16 to facilitate an adjustment of the best common voltage.

Figure 6:
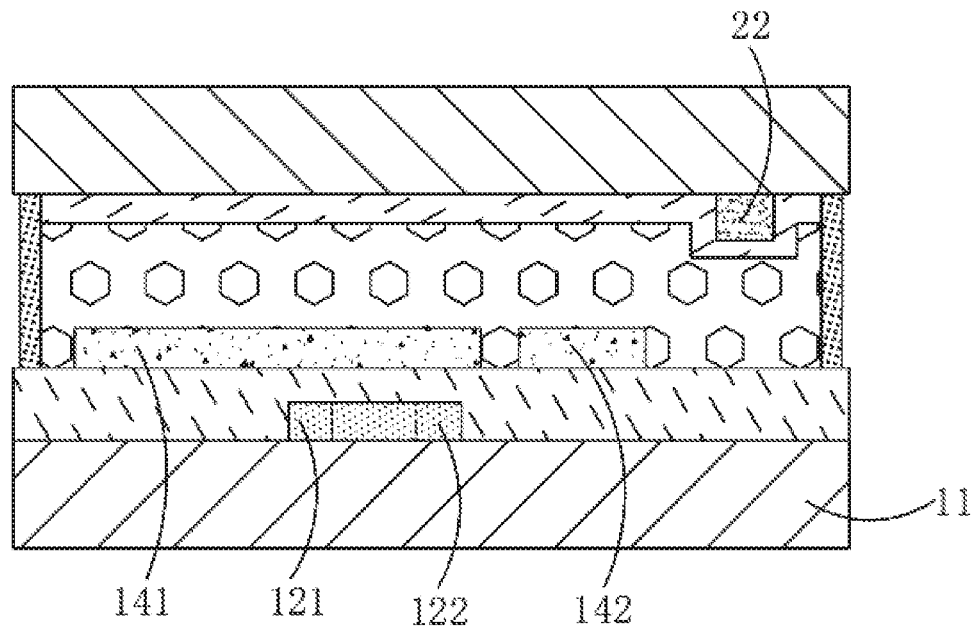
FIG. 6 is a schematic structural view of a display panel according to a fifth embodiment of the present invention.

In a fifth embodiment, as shown in FIG. 6, an orthographic projection of the main pixel electrode 141 projected on the first substrate 11 covers an orthographic projection of the gate 12 projected on the first substrate 11.

Further, an orthographic projection of the black matrix 22 projected on the first substrate 11 does not coincide with the orthographic projection of the gate 12 projected on the first substrate 11.

The parasitic capacitance of the primary region 15 is increased, and the main pixel electrode 141 is used to block the edges of the gate 12 simultaneously to reduce the area of the black matrix 22.

The beneficial effects of the invention are: the pixel electrode 14 is used to shield the edge portion of the gate 12, and the pixel electrode 14 is used to effectively shield the electric field between the edge portion of the gate 12 and the common electrode 23, thereby preventing the voltage difference between the gate 12 and the common electrode 23 from causing the liquid crystals to deflect and causing light leakage, and improving display quality. Moreover, the area of the black matrix 22 can be reduced to improve the aperture ratio and transmittance of a pixel. When the main pixel electrode 141 is overlapped with the gate 12, it can also balance the best common voltage in the primary region 15 and the best common voltage in the secondary region 16 to prevent problems such as crosstalk and image sticking.

In the above embodiments, the description of each embodiment has its own emphasis. For a part that is not described in detail in the embodiment, refer to the description of other embodiments.

Specific examples are used in this article to explain the principle and implementation of this application. The descriptions of the above embodiments are only used to help understand the technical solution of this application and its core ideas. A person of ordinary skill in the art should understand that it can still modify the technical solutions described in the foregoing embodiments, or replace some of the technical features equivalent. These modifications or replacements do not make the essence of the corresponding technical solutions outside the scope of the technical solutions of the embodiments of the present invention.

What is claimed is:

1. A display panel, comprising:
    an array substrate and a color filter substrate disposed opposite to each other, and a liquid crystal layer disposed between the array substrate and the color filter substrate, wherein the array substrate comprises a first substrate and a plurality of pixel units distributed on the first substrate in an array, and the color filter substrate comprises a second substrate and a black matrix disposed on a side of the second substrate close to the array substrate;
    wherein the pixel units comprise a gate disposed on the first substrate and a pixel electrode disposed above the gate, wherein the pixel electrode comprises a main pixel electrode and a sub-pixel electrode that are independent of each other, the gate is formed of an opaque metal material, and the gate comprises a first edge portion disposed adjacent to the pixel electrode and a second edge portion facing away from the first edge portion;
    wherein an orthographic projection of the black matrix projected on the first substrate does not coincide with an orthographic projection of the first edge portion projected on the first substrate, an orthographic projection of the main pixel electrode projected on the first substrate covers the orthographic projection of the first edge portion projected on the first substrate, and an orthographic projection of the sub-pixel electrode projected on the first substrate covers an orthographic projection of the second edge portion projected on the first substrate.

2. The display panel as claimed in claim 1, wherein an orthographic projection of the pixel electrode projected on the first substrate covers an orthographic projection of the gate projected on the first substrate.

3. The display panel as claimed in claim 1, wherein an overlapping area of the orthographic projection of the main pixel electrode projected on the first substrate and an orthographic projection of the gate projected on the first substrate is greater than an overlapping area of the orthographic projection of the sub-pixel electrode projected on the first substrate and the orthographic projection of the gate projected on the first substrate.

4. The display panel as claimed in claim 1, wherein the orthographic projection of the main pixel electrode projected on the first substrate covers an orthographic projection of the gate projected on the first substrate.

5. The display panel as claimed in claim 2, wherein the orthographic projection of the black matrix projected on the first substrate does not coincide with the orthographic projection of the gate projected on the first substrate.

6. A display panel, comprising:
    an array substrate and a color filter substrate disposed opposite to each other, and a liquid crystal layer disposed between the array substrate and the color filter substrate, wherein the array substrate comprises a first substrate and a plurality of pixel units distributed on the first substrate in an array, and the color filter substrate comprises a second substrate and a black matrix disposed on a side of the second substrate close to the array substrate;
    wherein the pixel units comprise a gate disposed on the first substrate and a pixel electrode disposed above the gate, wherein the pixel electrode comprises a main pixel electrode and a sub-pixel electrode that are independent of each other, and the gate comprises a first edge portion disposed adjacent to the pixel electrode and a second edge portion facing away from the first edge portion;

wherein an orthographic projection of the black matrix projected on the first substrate does not coincide with an orthographic projection of the first edge portion projected on the first substrate, an orthographic projection of the main pixel electrode projected on the first substrate covers the orthographic projection of the first edge portion projected on the first substrate, and an orthographic projection of the sub-pixel electrode projected on the first substrate covers an orthographic projection of the second edge portion projected on the first substrate.

7. The display panel as claimed in claim 6, wherein an orthographic projection of the pixel electrode projected on the first substrate covers an orthographic projection of the gate projected on the first substrate.

8. The display panel as claimed in claim 6, wherein an overlapping area of the orthographic projection of the main pixel electrode projected on the first substrate and an orthographic projection of the gate projected on the first substrate is greater than an overlapping area of the orthographic projection of the sub-pixel electrode projected on the first substrate and the orthographic projection of the gate projected on the first substrate.

9. The display panel as claimed in claim 6, wherein the orthographic projection of the main pixel electrode projected on the first substrate covers an orthographic projection of the gate projected on the first substrate.

10. The display panel as claimed in claim 7, wherein the orthographic projection of the black matrix projected on the first substrate does not coincide with the orthographic projection of the gate projected on the first substrate.

\* \* \* \* \*